Oct. 19, 1937.   F. M. GRIETEN   2,096,299
FISHING REEL
Filed June 25, 1936   2 Sheets-Sheet 2
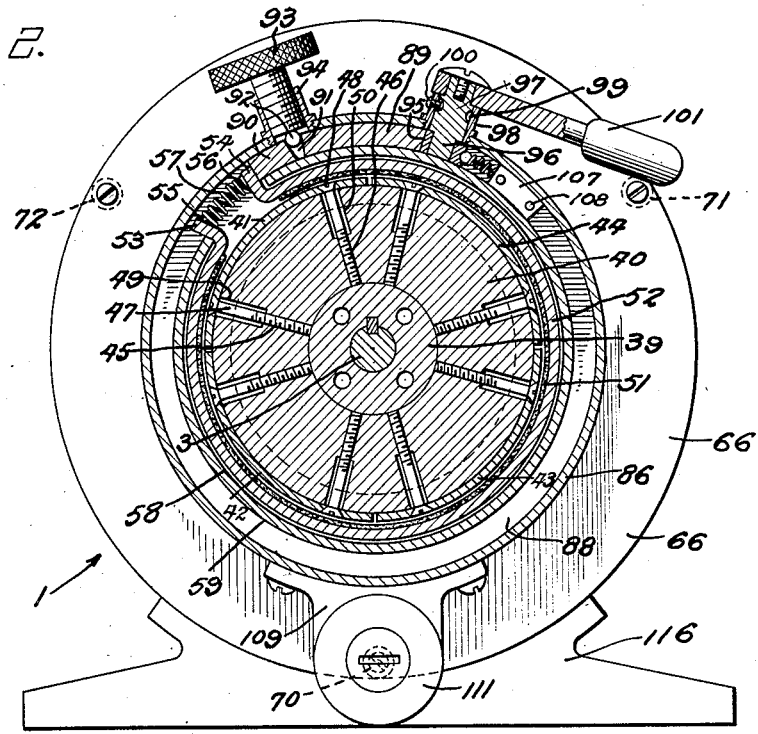
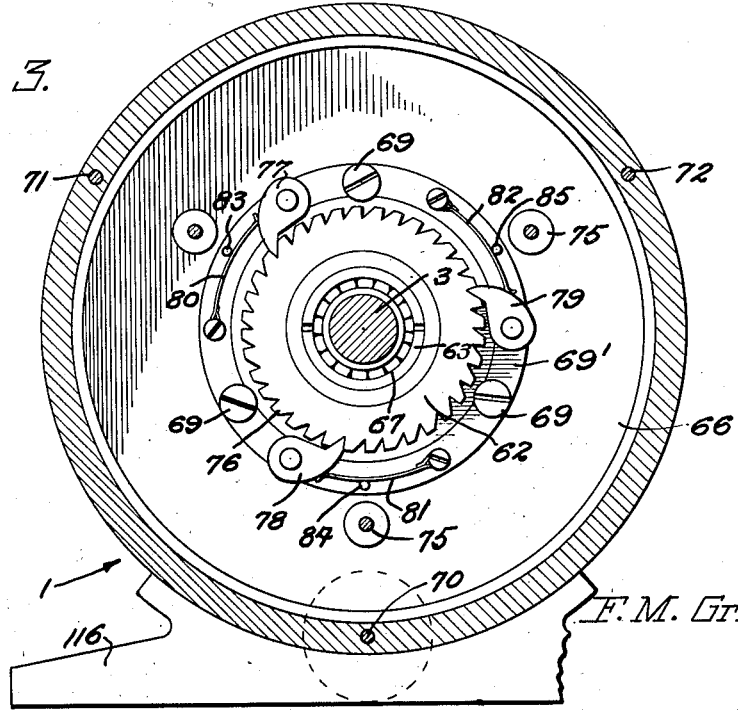
Inventor
F. M. Grieten
By Mason, Fenwick & Lawrence
Attorneys Patented Oct. 19, 1937

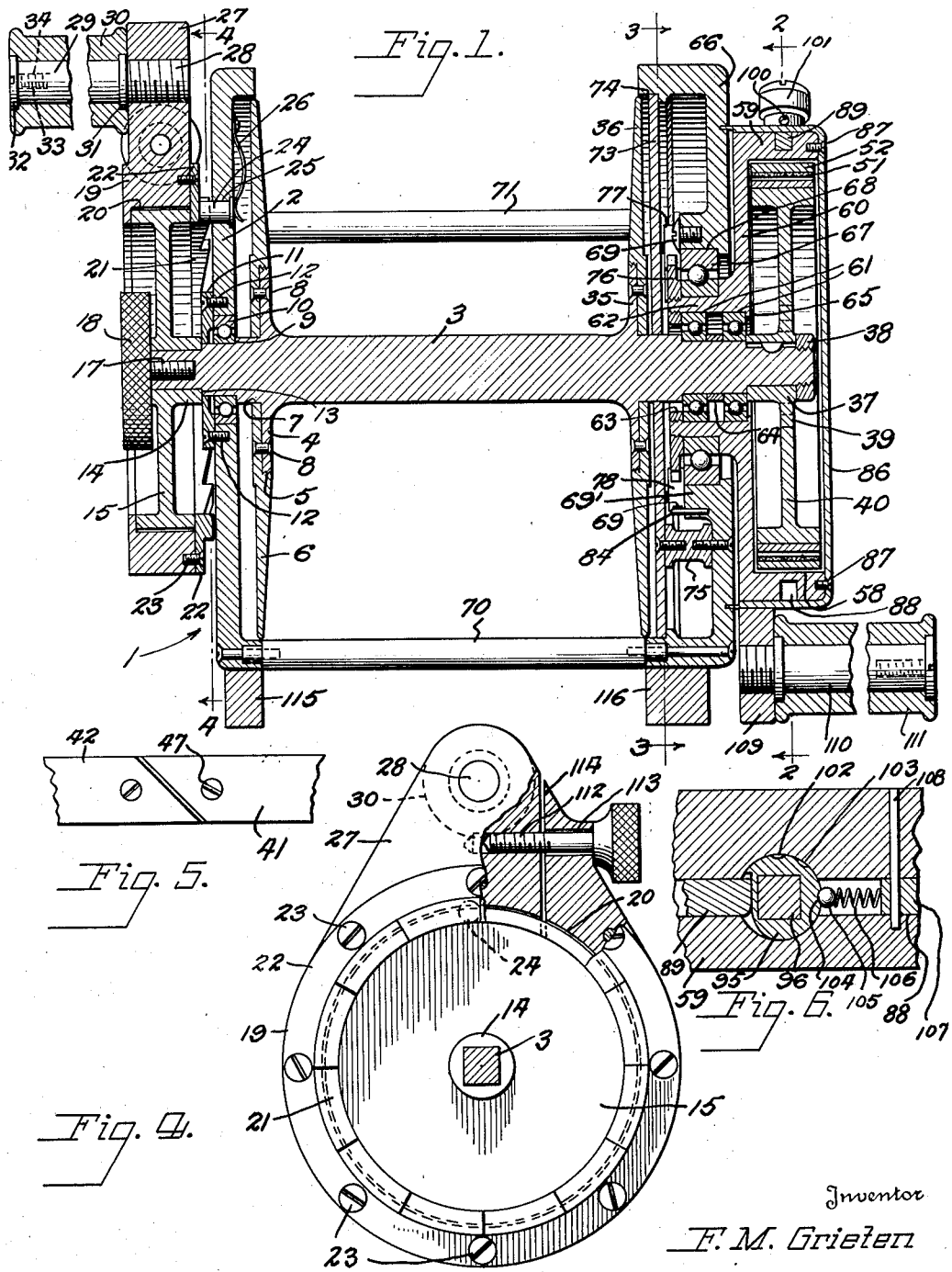

2,096,299

UNITED STATES PATENT OFFICE 2,096,299

FISHING REEL

Frederick Martin Grieten, Miami, Fla.

Application June 25, 1936, Serial No. 87,285

11 Claims. (Cl. 242—84.5)

The invention forming the subject matter of this application is a fishing reel designed to be mounted upon a fixed support for use in catching large salt-water game fish.

The main object of the invention is to provide a fishing reel of the large type with braking mechanism adjustable to regulate the braking force to be applied to the reel and, hence, to the line.

A further object of the invention is to provide a fishing reel with adjustable braking mechanism designed to eliminate expansion of said mechanism due to heat, and therefore to eliminate all possibility of seizing or grabbing of the line ordinarily due to such expansion; and adapted to hold the line under constant tension.

Another object of the invention is to provide a reel of the character described with an efficient auxiliary handle and brake mechanism.

Other objects of the invention will become apparent as the detailed description thereof proceeds.

In the drawings:

Figure 1 is a central vertical section through a fishing reel constructed in accordance with the present invention;

Figure 2 is a vertical section taken on the line 2—2 of Figure 1;

Figure 3 is a vertical section taken on the line 3—3 of Figure 1;

Figure 4 is a vertical section taken on the line 4—4 of Figure 1;

Figure 5 is a detail illustrating the shapes and relative positions of adjacent cast iron segments which form part of braking mechanism embodied in the present invention; and Figure 6 is a detail in section to an enlarged scale illustrating part of manually operable braking mechanism.

As shown in the drawings the fishing reel comprises a frame designated generally by the reference numeral 1. This frame includes a circular housing plate 2 in which is journaled one end of the reel shaft 3. The shaft 3 has a circular flange 4 extending perpendicular to the axis of the shaft and screw-threaded to receive the internal screw-threads 5 formed on a circular plate 6 which serves to limit in one direction, the movement of the line around the shaft 3. The plate 6 is provided at its center with an aperture 7 which fits snugly and slidably on the shaft 3; and is also provided with an annular recess forming a seat for the flange 4. When the plate 6 is screwed onto the flange 4 and is seated in the said recess, the flange and plate may be permanently secured to each other by any suitable securing means such as the rivets 8. The diameter of the shaft 3 outwardly from the plate 6 is reduced to form a shoulder 9 against which is seated an annular ball bearing 10 which forms the journal bearing for the shaft 3 in the housing plate 2. A ring 11 fits snugly on the reduced part of the shaft 3 and is suitably secured to the side plate 2 by means of the machine screws 12 to hold the bearing 10 against the shoulder 9.

At the outer face of the ring 11 the shaft 3 is again reduced to form the shoulder 13; and this shoulder forms a stop for the hub 14 at the center of a brake drum 15 keyed on to the last named reduced portion. The end of shaft 3 adjacent the brake drum 15 is bored axially and threaded to receive a machine screw 17 projecting from the center of a manually operable button 18, the inner face of which is adapted to contact with the adjacent end of the hub 14 to clamp the brake drum 15 securely against the shoulder 13.

The brake drum 15 is surrounded by a brake band 19 having an annular recess 20 receiving the cylindrical periphery and plane outer edge of the brake drum 15. A ratchet ring 21 having an annular flange 22 projecting therefrom, is secured to the inner face of the brake band 19 by means of the machine screws 23. A pin 24 slidably mounted in an aperture 25 formed in the housing plate 2, is held normally in yielding contact with the ratchet teeth of the ring 21, by means of a leaf spring 26 having one of its ends fixed to the housing plate 2 and its free end bearing against the end of the pin 24, to prevent rotation of the brake band 19 in one direction.

The frictional contact of the brake band 19 with the outer periphery of the brake drum 15 is secured by splitting the brake band substantially as shown in Figure 4 of the drawings. As will be seen from Figure 4 of the drawings, part of the brake drum band 19 is shaped to form a somewhat triangular extension 27 which is bored near its outer end to receive the internally screw-threaded end 28 of a cylindrical rod 29 having a handle 30 rotatable thereon. One end of the rod 29 is provided with a flange 31 adapted to contact with the face of the extension 27 to clamp the rod 29 against that extension. The handle 30 is recessed at its inner end to receive this flange 31; and at its outer end, is similarly recessed to receive the circular head 32 of a machine screw 33 threaded into the internally screw-threaded bore 34 in the outer end of the rod 29.

The shaft 3 near its other end is provided with a flange 35 similar in every respect to the flange 4; and this flange 35 has secured thereto the plate 36, similar to plate 6, to prevent or limit the movement of the cord at the right hand end of the shaft 3. The said other end of the shaft 3 is reduced in diameter to receive a bronze boss 37 which is keyed thereto and is secured in place by a nut 38 screw-threaded onto the externally screw-threaded end of said reduced end.

The boss 37 is provided with a flange 39 to which is secured a brake drum 40 made of "formica" or other material which has practically no expansion under heat. The drum 40 has seated on its cylindrical outer end a series of cast iron segments 41, 42, 43, and 44. To secure the segment 41 on the cylindrical periphery of the formica drum, the latter is bored radially (see Figure 2) to receive the shanks 45 and 46 of the screws 47 and 48, respectively, the externally screw-threaded ends of the shanks 45 and 46 engaging internally screw-threaded radial bores formed in the bronze flange 37. The cast iron segment 41 is bored and countersunk to receive the tapered heads of the screws 47 and 48; and the upper part of the bores in the formica drum are enlarged, as indicated at 49 and 50 in Figure 2, to permit a slight bending of the screws 47 and 48 in either direction during the expansion and contraction of the cast iron segment 41.

The segments 42, 43, and 44 are secured in the same manner to the bronze flange 37; and the adjacent ends of the segments are spaced apart sufficiently to permit expansion of the segments without danger of buckling. The ends of the adjacent segments are parallel to each other and inclined across the periphery of the drum, as shown in Figure 5 of the drawings, so as to distribute the binding contact with these segments of a brake lining 51 which is suitably secured to a brake band 52 surrounding the drum.

The brake band 52 is provided at its opposite ends with upturned flanges 53 and 54, having studs 55 and 56 projecting therefrom to receive the opposite ends of a compression spring 57 separating the opposite ends of the brake band from each other, and thereby maintaining the brake lining 51 normally spaced from the cast iron segments on the drum 40.

The brake band and brake drum are mounted to rotate in the annular recess 58 formed by an annular flange 59 projecting from the outer edge of a disc 60, apertured at its center to receive the ball bearings 61 for mounting it to rotate about the axis of the shaft 3. The ball bearings 61 are seated in a recess formed in a flange 62 projecting from the disc 60 in a direction opposite to that of the flange 59. The flange 62 is internally screw-threaded to receive the screw-threads of a ring 63 which clamps the ball bearings 61 separated by a spacing ring 64 against a small flange 65 formed on the disc 60.

The disc 60 is mounted to rotate in the dished housing 66 on ball bearing 67 interposed between the said disc and housing, as shown in Figure 1 of the drawings. The ball bearing 67 seats against the shoulder formed by a recess 68 in the housing 66; and the heads of screws 69 clamp the ball bearings 60 in said recess. The housings 2 and 66 are rigidly connected to each other in properly spaced apart relation by the cross bars 70, 71, and 72; and a cover plate 73 is secured in an annular recess 74 of the housing 66 by means of the spacers 75 and screws connecting them to said plate and housing 66.

A ratchet disc 76 is screwed onto the inner end of the flange 62 and has its outer edge notched to receive the pointed ends of pawls 77, 78, and 79 which are pivoted on the flange 69' receiving the screws 69 (see Figures 1 and 3).

The pawls 77, 78, and 79 are held yieldingly against the outer periphery of the ratchet ring 76 by means of the springs 80, 81, and 82, each of which is suitably secured at one end to the flange 69'. Pins 83, 84, and 85 engage the center parts of these springs to maintain their free ends in yielding contact with the pawls 77, 78, and 79.

The brake drum 40 and the disc 60 and mechanism enclosed in that disc are covered by a casing 86 which is secured to the annular flange 59 by means of the screws 87. The flange 59 is provided with a groove 88 extending around and into the periphery thereof; and this groove 88, near the flange 54 of the brake band 52 has arranged therein two arcuate strips 89 and 90 having their adjacent ends separated by a slot 91, the opposite walls of which converge toward the center of the braking drum. A ball 92 seated in the wider part of the slot 91 maintains the separation of the segmental members 89 and 90, the degree of separation being controlled by the adjustment of a screw 93 in a thimble 94 extending radially from the casing 86. It will be obvious from inspection of Figure 2 of the drawings that if the segment 89 be held stationary, the adjustment of the screw 93 toward the center of the drum will force the ball 92 into the slot 91 and will increase the pressure of the segment 90 against the flange 54 of the brake band, and will move the brake band and its lining toward braking contact with the cast iron segments on the periphery of the brake drum.

The segment 89 at the end opposite the ball 92 is in contact with a cam 95 (see Figures 2 and 6), which is mounted on the squared end 96 of the stub shaft 97 rotatably mounted in a thimble 98 projecting radially from the casing 86. The stub shaft 97 is provided with an annular groove 99 receiving the end of a set screw 100 to retain the shaft rotatable in the housing 86. A handle 101 suitably secured to the outer end of the stub shaft 97 facilitates rotation of the cam 95 within its housing. The cam 95 is also provided with angularly spaced arcuate recesses 102, 103, and 104 adapted to receive a ball 105 for the purpose of locking the cam 95 yieldingly in any one of the positions corresponding to the location of the recesses 102, 103, and 104.

The ball 105 is held in yielding contact with the periphery of the cam 95 by means of a spring 106 which engages the ball 105 at one of its ends, and which, at its other end, seats against an abutment 107 suitably secured in the groove 88 by a pin 108 extending through the aforesaid housing 86 and the groove 88 formed in the flange 59 and the abutment 107. It will be obvious from inspection of Figures 2 and 6 that rotation of the cam clockwise as seen in Figure 6 will move the segment 89 toward the segment 90 and will also move the brake band towards contact position on the periphery of the brake drum. The handle 101 may therefore serve as a means for coarsely adjusting the brake band toward the braking drum and the adjusting screw 93 may be used to set in the finer adjustments.

A bracket 109 suitably fixed to the rim of the casing 86 has a rod 110 secured thereto and provided with a sleeve 111 rotatable on said rod to form a handle to rotate the reel shaft 3 when the brake band 52 is in braking contact with the brake drum 40. Adjustment of the brake band 20 (see Figure 4) into braking contact with brake drum 15 is secured by the adjustment of a screw 112 threaded into the extension 27 and passing through a bore 113 formed in the band on the side of the split 114 remote from rod 29. The braking mechanism connected to rod 29 supplements the more complicated braking mechanism on the other side of the reel and may be used either separately from, or conjointly therewith.

Any suitable means such as the brackets 115 and 116, secured to the housings 2 and 66, respectively, may be used to fix the reel as a whole to any fixed standard or other part of a boat.

It will be evident from inspection of the drawings that the reel forming the subject matter of this invention provides clutch mechanisms for properly regulating the tension and the playing out of the line in accordance with the size of the "catch", and the conditions attendant upon the landing thereof. It will also be evident that the connection between the reel and the handle is such that the line may be played out under any desired tension, which may be released instantly by the operation of the cam mechanism which, in predetermined steps, adjusts the frictional contact of the brake band with the brake drum. The variable adjusting device regulates the friction between the brake band and brake drum to meet the various conditions of use; while the lever controlled cam is operable to throw the brake mechanism instantaneously into or out of operative position without affecting the adjustment by the other line tensioning device.

It is to be understood that the invention is not to be considered as limited to the specific construction and arrangement described herein, since it is evident that many changes may be made without departing from the scope of the invention as defined by the claims appended hereto.

What I claim is:

1. A fishing reel adapted to be secured to a support, and comprising: a frame including housing plates spaced apart substantially parallel to each other, a spool shaft journaled in and projecting beyond said housing plate, a brake drum fixed to one of the projecting ends of said shaft, a brake band mounted to rotate on said brake drum, a ratchet ring secured to said band concentric with said shaft, a pin projecting slidably through the adjacent housing plate, means on said housing plate for holding the pin in yielding contact with the teeth of said ratchet, said band having a part thereof projecting outwardly from said drum, said part being split and the split ends being normally separated by the resilience of the band, means for adjusting the split ends toward each other to regulate the frictional contact between the brake drum and band, and a handle secured to said projecting end for rotating said brake band.

2. A fishing reel adapted to be secured to a support, and comprising: a frame including housing plates spaced apart substantially parallel to each other, a spool shaft journaled in and projecting beyond one of said housing plates, a brake drum fixed to the projecting end of said shaft, a disc journaled to rotate in said housing plate about the axis of said shaft and having an annular flange concentric with said axis, said flange having a groove extending around its outer periphery and having a slot through the bottom of said groove, a brake band interposed between said drum and the inner periphery of said flange and having its opposite ends upturned to project through said slot into said groove, one of said ends being in contact with an end wall of said slot, a spring interposed between said opposite ends to maintain the band normally out of frictional contact with said drum, and means for moving the other upturned end toward the first named end to effect frictional engagement between said band and drum.

3. The device set forth in claim 2, in which said adjusting means comprises a pair of segmental plates mounted to slide in said groove and having their adjacent ends inclined toward each other, a stop in said groove for one end of one of said segments, and means adjustable radially in the space between said segments to move one of said upturned ends toward the other end to regulate the frictional contact between the brake band and brake drum.

4. The device set forth in claim 2, in which said moving means comprises a pair of segmental plates slidable in said groove and having their adjacent ends converging inwardly to form a V-joint, a stop in said groove for one of said segments, and means adjustable radially in said V-joint, to effect the movement of one of said plates against one of the upturned ends of said brake band to regulate the frictional contact between said brake band and brake drum.

5. In a fishing reel, a frame adapted to be secured to a fixed support, a spool shaft rotatable in said frame, a disc rotatable on said frame about the axis of said shaft and having an annular flange projecting from the periphery thereof, a handle secured to said disc, a brake drum fixed to said shaft to rotate within said annular flange, said flange being provided with a groove around the periphery thereof and with the slot extending through the bottom of said groove, a brake band extending around the inner periphery of said flange and over the periphery of said brake drum and having its opposite ends upturned through said slot and into said groove, yielding means between the upturned ends for holding the brake band normally out of contact with said brake drum, a stop extending through said handle into said groove, and means located in said groove between said stop and one of said upturned ends to move said upturned end toward the other end for causing frictional contact of the brake band with said brake drum.

6. The device set forth in claim 5 in which said stop includes a cam rotatable in said groove against the end of said means, means for moving said stop within said groove to control the movement of the adjacent upturned end of said brake band, and means for locking said stop yieldingly in different positions on said handle.

7. In a fishing reel, a frame adapted to be secured to a fixed support, a spool shaft rotatable in said frame, a disc rotatable on said frame about the axis of said shaft and having an annular flange projecting from the periphery thereof, a casing enclosing said disc and flange and fixed thereto, a handle secured to said casing, a brake drum fixed to said shaft to rotate within said annular flange, said flange being provided with a groove around the periphery thereof and with a slot extending through the bottom of said groove, a brake band extending around the inner periphery of said flange and around said brake drum, and having its opposite ends upturned through said slot and into said groove, yielding means interposed between said upturned ends for holding the brake band normally out of frictional contact with said drum, a cam rotatably mounted on said casing and extending into the groove in said flange, a pair of segmental plates interposed between said cam and one of the said upturned ends, the adjacent ends of said plates being inclined toward each other and slightly spaced apart, and means on said casing radially adjustable across the space between said plates to move the adjacent upturned ends of the brake band toward the other end thereof.

8. The device set forth in claim 7 in combination with means for rotating said cam to adjust said pair of segmental plates toward and from the adjacent upturned ends of the brake band, and means for locking the cam in different positions of adjustment in said groove.

9. The device set forth in claim 7 in combination with means for rotating said cam to adjust said pair of segmental plates toward and from the upturned ends of the brake band, a handle secured to said cam, and means in said groove in yielding engagement with the periphery of said cam for locking the cam in different positions of angular adjustment within said groove.

10. The device set forth in claim 7 in which the last named means comprises a ball interposed in the joint between said pair of segmental plates, and a screw rotatable radially on said casing against said ball to control the separation of said plates and the movement of one of them toward the adjacent upturned ends of the brake band.

11. In a fishing reel, a frame, a spool shaft rotatable in said frame, a brake drum of heat insulating material, means for fixing said brake drum to said shaft with its axis coincident with the axis of said shaft, a plurality of segmental plates secured to the periphery of said drum with their adjacent ends normally slightly separated from each other, a disc rotatable on said frame about the axis of said shaft, a brake band mounted on said disc and around said drum, means for holding the opposite ends of said brake band yieldingly separated from each other, and means for moving the ends of said band toward each other to vary the frictional contact of the band with said segments.

FREDERICK MARTIN GRIETEN.